A. T. NYBERG.
SHIPPING CASE.
APPLICATION FILED DEC. 31, 1913.

1,127,273.

Patented Feb. 2, 1915.

Inventor
A. T. Nyberg.
By Victor J. Evans
Attorney

Witnesses
W. R. Smith

UNITED STATES PATENT OFFICE.

AXEL T. NYBERG, OF SALEM, MASSACHUSETTS.

SHIPPING-CASE.

1,127,273. Specification of Letters Patent. Patented Feb. 2, 1915.

Application filed December 31, 1913. Serial No. 809,747.

*To all whom it may concern:*

Be it known that I, AXEL T. NYBERG, a citizen of the United States, residing at Salem, in the county of Essex and State of Massachusetts, have invented new and useful Improvements in Shipping-Cases, of which the following is a specification.

This invention relates to shipping cases and more particularly to that type which are adapted for shipping eggs and other fragile articles.

The principal object of the invention is to provide a simple, inexpensive and durable device which when not in use may be collapsed or knocked down for return shipment and storage whereby little space will be occupied by the device when not in use.

Further objects of the invention will appear as the following specific description is read in connection with the accompanying drawing, which forms a part of this application, and in which:—

Figure 1:
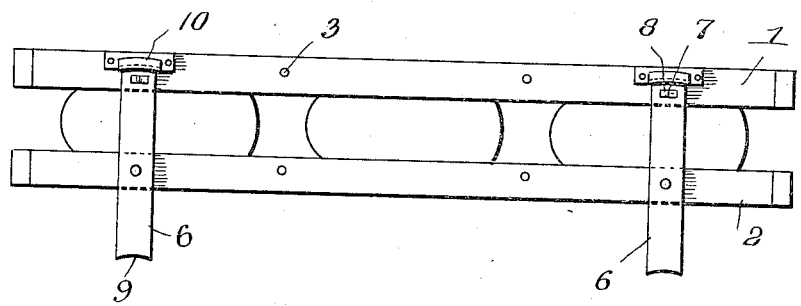
Figure 2:
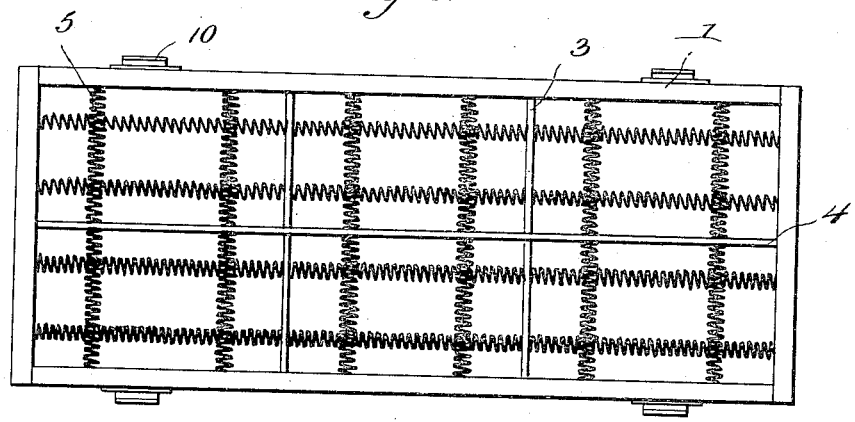
Figure 3:
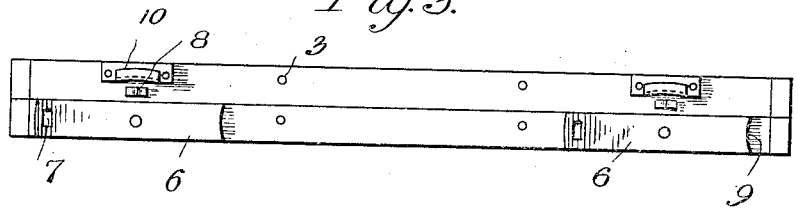

Figure 1 is a side elevation. Fig. 2 is a top plan view. Fig. 3 is a side elevation with the parts knocked down or collapsed.

In illustrating the present device, only the frames or egg carriers have been shown, the casing inclosing them being eliminated for purpose of clearness. It will be understood, however, that these frames in themselves may be utilized independently of any casing for shipping the eggs or a knock-down casing of any suitable type may be employed.

In the present drawings only one set of frames or carriers has been shown, but it will be clearly understood that any number of these frames may be connected together in any suitable manner, such as by placing them in a knock-down casing or the like or securing them together by suitable straps. The invention, however, does not reside in a connecting means but in the particular method of holding the frames in operative position and in permitting them to be knocked down or collapsed. Each egg carrier comprises a pair of frames 1 and 2, preferably of rectangular form and having extended across their sides the bracing rods 3 and 4. Each frame has extended across the same from end to end and from side to side a plurality of springs 5 which are interengaged at their intersections, as shown, and form egg receiving compartments between the upper and lower frames.

The lower frame 2 has a plurality of dogs 6 pivoted thereto and provided at one terminal with a recess or aperture 7 to receive a headed stud 8 carried upon the upper frame. The opposite terminal of the dog is recessed, as shown at 9, to rest upon an abutment 10 of the next lower set of frames, the abutments 10 being secured upon the upper frame 1, preferably immediately above the studs 8. When the dogs 6 are turned at right angles to the frame and the headed studs engaged with the apertures therein the frame will be held in spaced relation with the springs 5 bearing with sufficient force against the eggs to prevent displacement thereof. When the eggs are removed and the frames are collapsed or knocked down for shipment the dogs are turned to the position shown in Fig. 3 in alinement with the frame 2 so that the frame 1 can be placed down upon the same, as will be readily understood.

By engaging the lower recessed end of the dog 6 upon the abutments 10 of the next lower set of frames the sets of frames may be supported in separated relation so that the eggs of one set of frames will not be brought into contact with the eggs in the frames on either side of them.

What is claimed is:—

An egg container for shipping cases comprising a pair of rectangular frames, egg supporting springs extending across the frames from end to end and side to side and interengaged at their intersections, and a plurality of dogs pivoted to one of the frames and having apertures in one end and recesses in the opposite end, headed studs upon the opposite frame adapted to be engaged in the apertures when the dogs are extended across the frame whereby the frames will be held in separated relation and abutments on one of the frames adapted to coöperate with the recesses of the dogs on the next set of frames and hold the sets of frames in spaced relation.

In testimony whereof I affix my signature in presence of two witnesses.

AXEL T. NYBERG.

Witnesses:
HORACE J. H. SEARS,
HARRY E. JACKSON.